United States Patent [19]
Watanabe

[11] Patent Number: 5,658,120
[45] Date of Patent: Aug. 19, 1997

[54] ARTICLE TRANSPORT SYSTEM AND CARRIAGE FOR USE THEREWITH

[75] Inventor: Haruhiro Watanabe, Kasugai, Japan

[73] Assignee: Daifuku, Co., Ltd., Japan

[21] Appl. No.: 650,960

[22] Filed: May 21, 1996

Related U.S. Application Data

[63] Continuation of Ser. No. 410,945, Mar. 27, 1995, abandoned, which is a continuation of Ser. No. 122,239, Sep. 16, 1993, abandoned.

[30] Foreign Application Priority Data

Sep. 21, 1992 [JP] Japan .................. 4-065305 U
Apr. 16, 1993 [JP] Japan .................. 5-019363 U

[51] Int. Cl.⁶ .................................................. B62D 21/09
[52] U.S. Cl. ........................ 414/495; 414/352; 414/529; 280/781
[58] Field of Search .................. 414/274, 278, 414/279, 284, 352, 353, 495, 497, 529; 280/781, 782, 783, 797, 798, 799, 800; 180/168

[56] References Cited

U.S. PATENT DOCUMENTS

| Re. 17,209 | 2/1929 | Oechsle | 280/799 X |
|---|---|---|---|
| 1,411,875 | 4/1922 | Schroeder | 280/783 |
| 1,648,826 | 11/1927 | Schroeder | 280/783 X |
| 2,558,562 | 6/1951 | Hutton | 280/782 X |
| 3,474,877 | 10/1969 | Wesener | 180/168 X |
| 3,685,854 | 8/1972 | Cadiou | 280/797 X |
| 3,881,568 | 5/1975 | Ando et al. | 180/168 |
| 4,037,738 | 7/1977 | Johnson | 414/495 X |
| 4,120,411 | 10/1978 | Johnson | 414/497 X |
| 4,137,984 | 2/1979 | Jennings et al. | 414/279 X |
| 4,657,463 | 4/1987 | Pipes | 414/495 |
| 4,732,819 | 3/1988 | Komuro | 280/798 X |
| 4,781,514 | 11/1988 | Schneider | 414/529 X |
| 4,863,335 | 9/1989 | Herigstad et al. | 414/495 |
| 4,958,844 | 9/1990 | Hancock | 280/797 X |
| 5,062,369 | 11/1991 | Cobden et al. | 280/781 X |
| 5,085,025 | 2/1992 | Gaddis | 280/800 X |
| 5,303,788 | 4/1994 | Muselli et al. | 280/781 X |

FOREIGN PATENT DOCUMENTS

| 3545452 | 6/1987 | Germany | 414/279 |
|---|---|---|---|
| 4204825 | 6/1993 | Germany | 280/781 |
| 0031115 | 3/1979 | Japan | 414/274 |
| 59-75880 | 6/1984 | Japan . | |
| 60-134077 | 4/1985 | Japan . | |
| 4-8628 | 7/1992 | Japan . | |
| 4345570 | 12/1992 | Japan | 414/529 |
| 2032867 | 5/1980 | United Kingdom | 414/279 |

*Primary Examiner*—James W. Keenan
*Attorney, Agent, or Firm*—Webb Ziesenheim Bruening Logsdon Orkin & Hanson, P.C.

[57] ABSTRACT

An article carriage includes a pair of hollow base frames arranged transversely and extending longitudinally thereof. Each base frame has engaging recesses extending longitudinally along outer walls thereof. The engaging recesses are used for assembling drive wheels, driven wheels, an article handling device, sensors, a communication unit and a control unit. Batteries are mounted in the base frames for driving these components except the driven wheels.

19 Claims, 9 Drawing Sheets

ARTICLE TRANSPORT SYSTEM AND CARRIAGE FOR USE THEREWITH

This is a continuation of application Ser. No. 08/410,945 filed on Mar. 27, 1995, now abandoned, which is a continuation of Ser. No. 08/122,239 filed on Sep. 16, 1993, now abandoned.

BACKGROUND OF THE INVENTION

1. Field of the Invention

This invention relates to an article carriage and an article transport system. More particularly, the invention relates to an article carriage including power storages, and a body frame having a pair of base frames arranged transversely and extending longitudinally of the carriage, and to an article transport system using this carriage.

2. Description of the Related Art

Conventionally, an article carriage has running devices, a load handling device and other devices assembled to a body frame. Simple pipe stock is used to form a pair of base frames constituting the body frame. The pair of base frames have mounting bores formed therein and mounting brackets welded or otherwise secured thereto for assembling the above devices. These devices are assembled to the body frame by means of bolts and nuts or the like.

In the prior art, as noted above, bores must be formed in the body frame and brackets secured thereto for assembling the devices. This results in the disadvantage of requiting a cumbersome operation to manufacture the body frame, and hence high manufacturing cost.

Different carriages are manufactured to have varied fore and aft dimensions to suit varied articles to be transported and to varied transport modes.

In the prior art, in order to manufacture carriages having varied fore and aft dimensions, base frames of different specifications are used to be processed for assembling the varied devices, and plural types of body frames are manufactured with varied specifications. Consequently, the above disadvantage is conspicuous where varied types of carriages are manufactured.

SUMMARY OF THE INVENTION

The present invention has been made having regard to the state of the art noted above, and its object is to simplify manufacture of body frames.

The above object is fulfilled, according to the present invention, by an article carriage comprising power storages, a body frame having a pair of base frames arranged transversely and extending longitudinally of the carriage, and engaging portions formed on the base frames and extending through an entire fore and aft length thereof for assembling varied devices of the carriage.

In the above construction, the pair of base frames constituting the body frame include engaging portions extending through an entire fore and aft length thereof. These engaging portions are used to assemble varied devices of the carriage including running devices and an article handling device.

To assemble the running devices, article handling device and various other devices to the body frame, these devices have elements for connection to the engaging portions.

To construct a carriage having a different fore and aft dimension, the fore and aft length of the base frames may be changed to form a body frame suited to this carriage. The varied devices may of course be assembled using the engaging portions, regardless of the size of the body frame.

Each base frame may be formed, for example, by extruding an elongate frame material and cutting the material to a predetermined length according to the fore and aft length of the carriage. Such a base frame may have engaging portions in the form of recesses or projections extending through the entire fore and aft length thereof for assembling varied devices.

Thus, varied devices are assembled to the body frame by means of an engaging type coupling structure including the engaging portions extending through the entire fore and aft length thereof. This body frame is easy to manufacture, compared with a conventional body frame requiring varied machining processes to enable assembly of varied devices.

The base frames may be formed by extruding an elongate frame material with the engaging portions, and cutting the material to a predetermined length, as noted above. The elongate frame material may be cut, taking a varied fore and aft length of the carriage into account, so that the resulting base frames are suited to the carriage. That is, the engaging type coupling structure is used to assemble varied devices to the body frame, which allows simplified manufacture of body frames for carriages having different fore and aft lengths.

Each base frame may have an elongated hollow structure with the engaging portions arranged on outer surfaces thereof.

The base frame having an elongated hollow structure is sufficiently strong and yet lightweight. Consequently, the body frame, and the entire carriage as well, may have a reduced weight.

A plurality of engaging portions as noted above may be distributed circumferentially of each base frame.

This construction allows selective use of those engaging portions suited to particular devices. The devices may be assembled reliably by selecting engaging portions in proper positions.

The power storages may be mounted in the hollow base frames constituting the body frame.

In this construction, the hollow spaces of the base frames are effectively used to accommodate the power storages. There is no need to provide additional spaces for accommodating the power storages. This achieves compactness and lightness of the body frame.

The carriage may include decks removably mounted in the base frames, with a plurality of power storages arranged on each of the decks.

When changing the power storages, for example, this construction allows all of the power storages as supported on one deck to be pulled out of each base frame at a stroke. It will be appreciated that a plurality of power storage are provided to facilitate handling thereof.

Thus, the plurality of power storages may be changed with ease by pulling out the deck from each base frame, thereby exposing all of the power storages thereon at a stroke.

The base frames may have the engaging portions disposed on outer walls thereof for assembling the devices.

This construction does not require additional components for assembling the devices, thereby enabling the body frame to be even more compact and lightweight.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

An article carriage according to the present invention will be described in detail with reference to the drawings.

Figure 5:
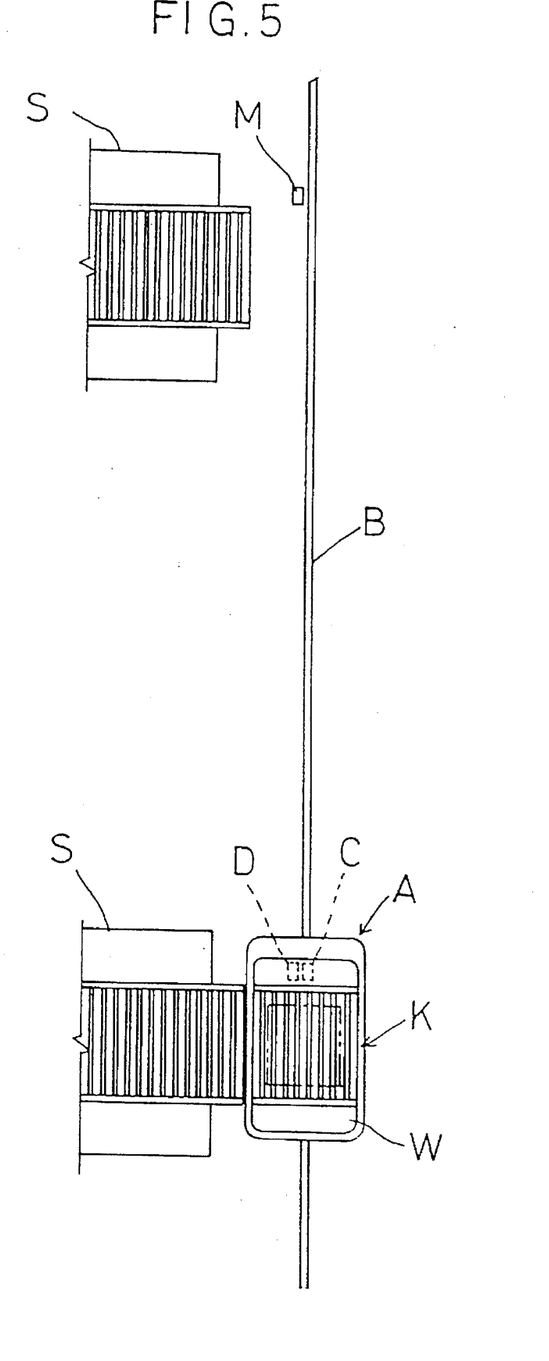
FIG. 5 is a plan view showing a running mode of the carriage.

As shown in FIG. 5, a carriage A transports varied loads from one station S to another. Guide tape B such as magnetic tape is laid along a running track of the carriage A. The carriage A is steered based on detection information provided by a steering control sensor C which detects the guide tape B. A mark M is disposed opposite each station S to indicate a stopping position. The carriage A is stopped at desired stations S based on detection information provided by a mark detecting sensor D.

A specific construction of the carriage A will be described in detail next.

Figure 1:
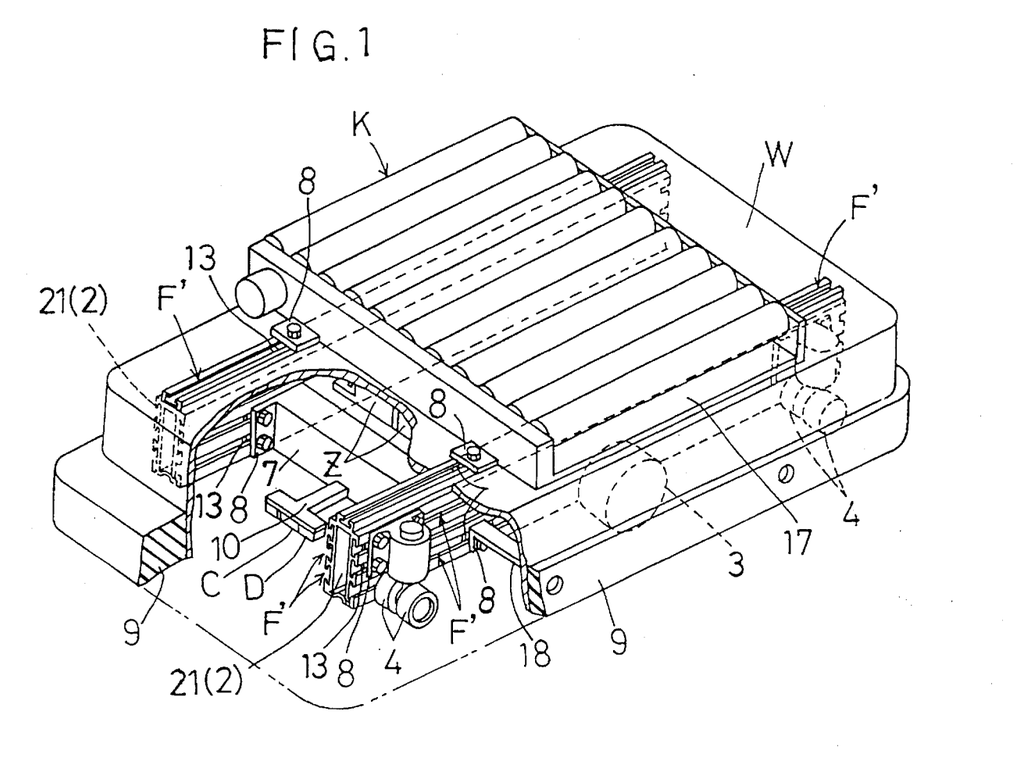
FIG. 1 is a perspective view, partly broken away, of an article carriage according to the present invention.
Figure 2:
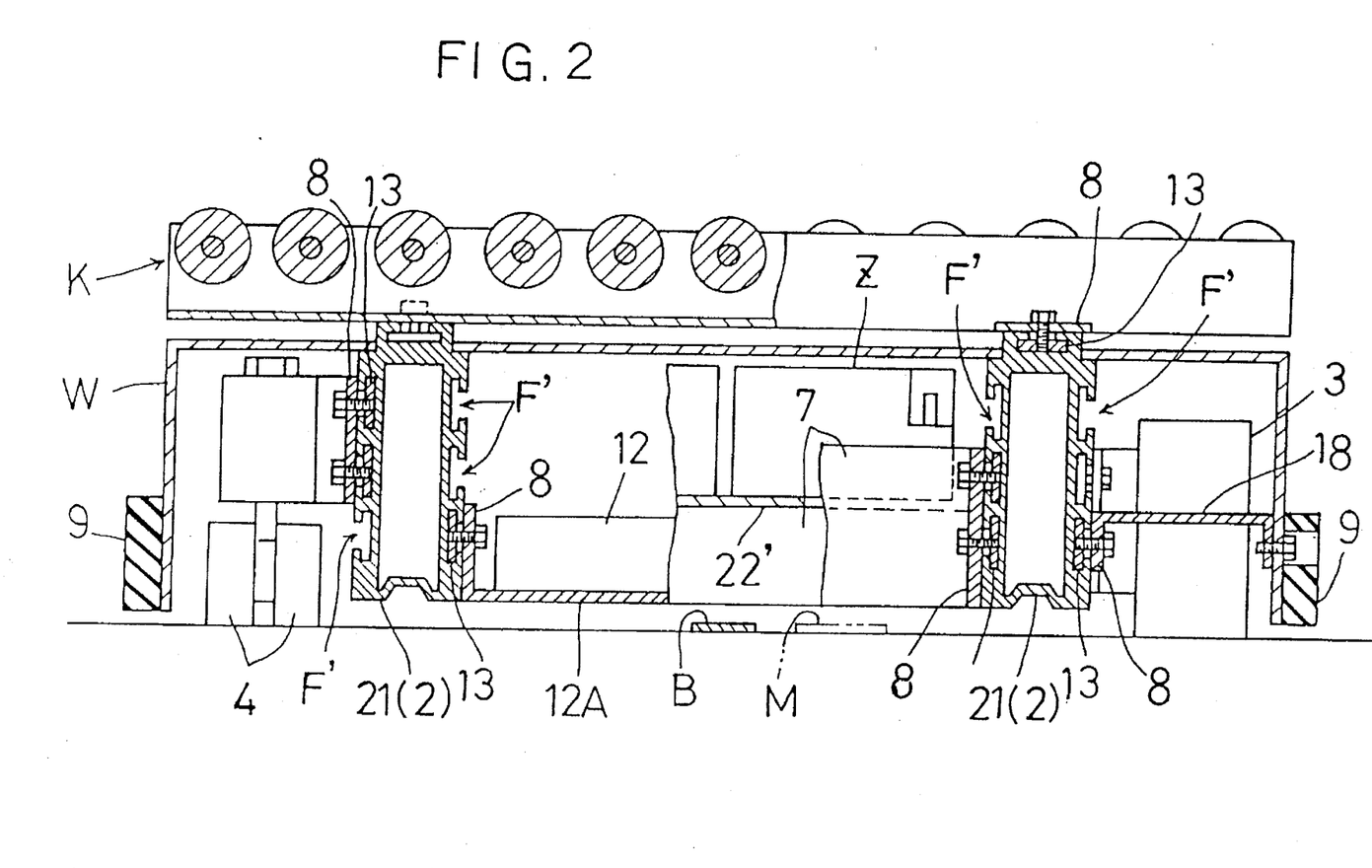
FIG. 2 is a sectional front view of the article carriage.
Figure 3:
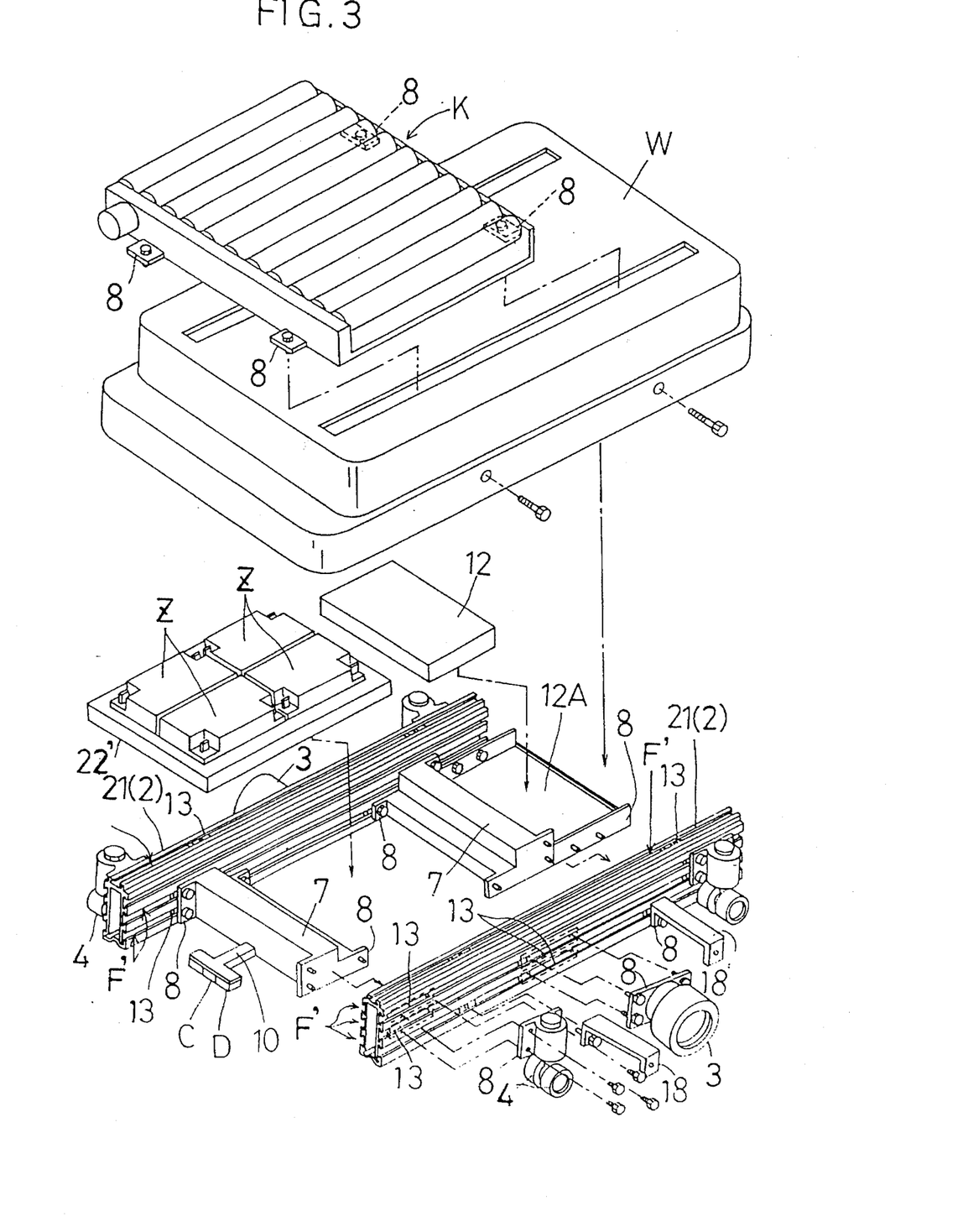
FIG. 3 is an exploded perspective view of the article carriage.

As shown in FIGS. 2 and 3, the carriage A includes a body frame 2 having a pair of base frames 21 arranged side by side and extending longitudinally thereof. Each of the base frames 21 defines engaging portions F' extending through an entire fore and aft length of the body frame 2 for attaching varied devices. Specifically, each base frame 21 has an elongated hollow structure with engaging portions F' in the form of T-shaped recesses arranged circumferentially thereof. Each base frame 21 is formed by extruding an elongated frame material and cutting the material to a predetermined length.

Figure 4:
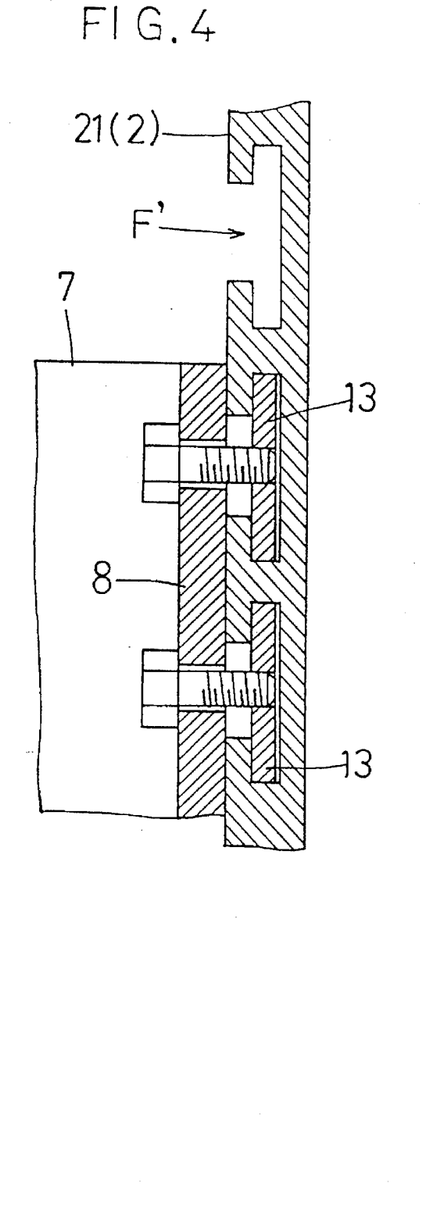
FIG. 4 is a front view in vertical section of an engaging type coupling structure.

The pair of base frames 21 are interconnected by a pair of front and rear connecting frames 7 arranged therebetween. As shown in FIG. 4, each connecting frame 7 is coupled to each base frame 21 through plate-like inserts 13 mounted in the engaging portions F' and a plate-like attaching member 8 secured to one end of the connecting frame 7 and bolted to the inserts 13.

A similar engaging type coupling structure including the inserts 13 and attaching member 8 is used for securing each of varied devices described hereinbelow. However, the description of the coupling structure will not be repeated.

A pair of right and left drive wheels 3 containing direct drive motors are attached to longitudinally intermediate positions of the pair of base frames 21 through engaging type coupling structures as described above. Four driven or free rotation wheels 4 having suspensions are attached to front and rear ends of the base frames 21, again, through engaging type coupling structures, respectively. Thus, the carriage A is steered by differentiating rotating rates of the right and left drive wheels 3.

A roller conveyor K is mounted on the body frame 2 for supporting articles, and delivering and receiving the articles to/from the stations S. The roller conveyor K has a frame 17 attached to the pair of base frames 21 through engaging type coupling structures as described above.

A cover W extends over lateral portions of the body frame 2. The cover W is supported by support frames 18 attached to the pair of base frames 21 through engaging type coupling structures as described above. The cover W is bolted to the support frames 18. A bumper 9 is attached peripherally of a lower end of the cover W to absorb impact.

The steering control sensor C and mark detecting sensor D are supported by a sensor frame 10 welded to one of the connecting frames 7.

The pair of connecting frames 7 support a deck 22' on which batteries Z are mounted to act as power storages for driving the devices, and a deck 12A on which a controller 12 is mounted for controlling running of the carriage A and loading and unloading of articles.

The components of the foregoing embodiment may be modified to suit varied purposes, as follows:

(1) The running device may comprise drive wheels and dirigible wheels.

(2) The load handling device may comprise a frame movable vertically and transversely of the body frame.

(3) Each base frame 21 may have engaging portions F' arranged only on part of the sides and top thereof.

(4) Each base frame 21 may have a solid structure instead of being hollow.

(5) The running device and load handling device may be attached to the base frames 21 in various other ways, including positions of the running device other than those shown in the foregoing embodiment.

A further embodiment will be described next.

Figure 10:
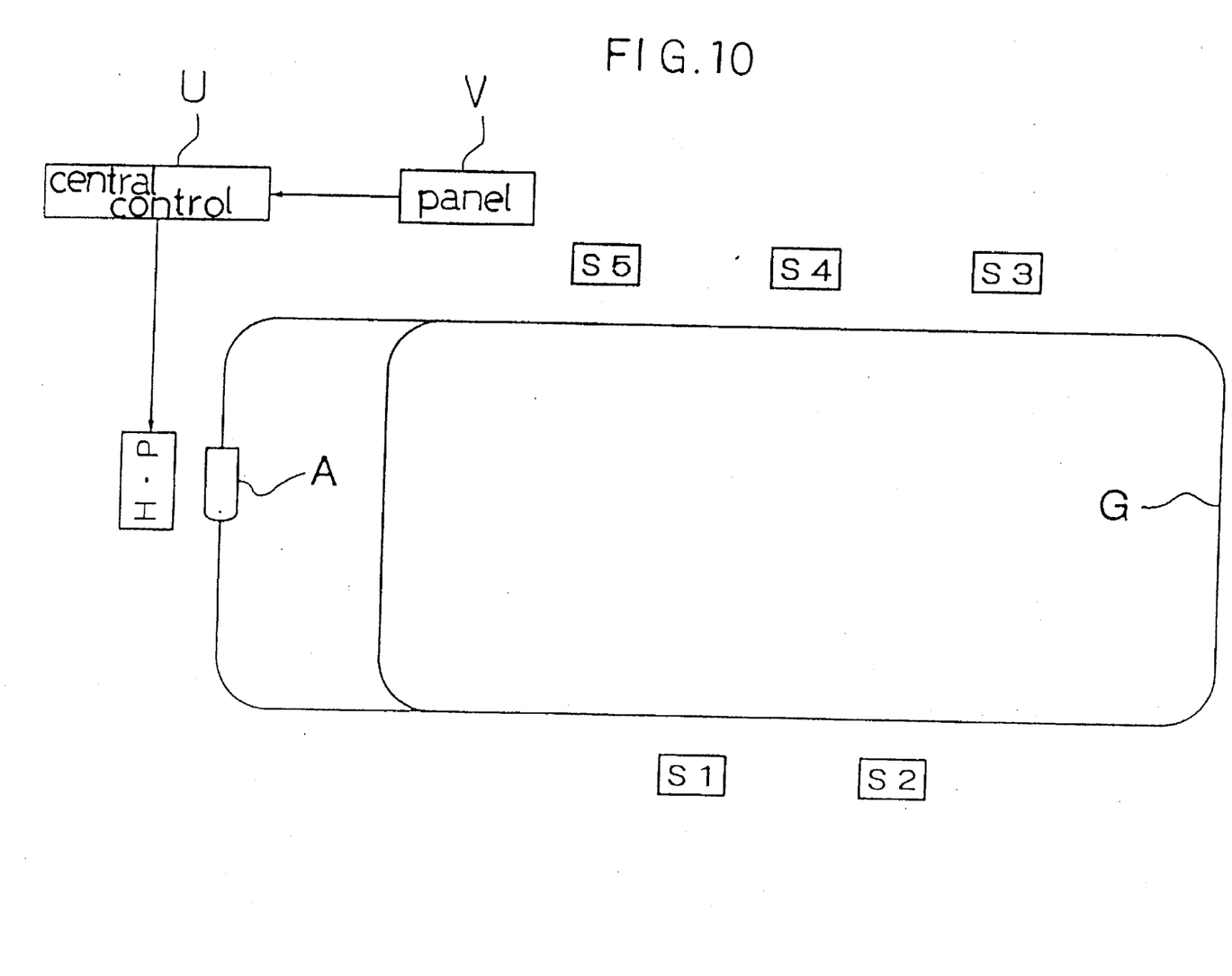
FIG. 10 is a plan view showing a running mode of the carriage shown in FIG. 6.

As shown in FIG. 10, an article transport system in this embodiment includes a carriage A for running along guidelines G laid on track surfaces, and a plurality of stations S. These stations are identified by references S1 to S5.

When one of article receiving stations S3–S5 has run out of articles, the operator operates a control panel V to output an article request (including identification of the station requesting articles) to a central control unit U. In response to the article request, the central control unit U transmits an instruction to home station HP for the carriage A to be loaded with the requested articles.

The carriage A receives this instruction from the home station HP, and collects the articles designated in the instruction from the article supplying station S1 or S2. Then the carriage A transports the articles to the receiving station S3, S4 or S5.

Though not shown in the drawings, the home station HP includes a communication unit for communicating with a communication unit 52 of the carriage A.

Referring to FIGS. 6 through 9, the carriage A includes an article handling device 1, a body frame 2 for supporting the article handling device 1 and other devices, a pair of front and rear drive wheel assemblies 3, a pair of right and left casters or driven wheels 4, and a control unit 5.

The carriage A further includes an optical sensor 51 for detecting the guidelines G, the communication unit 52 mentioned above, and an optical sensor 53 for confirming stopping positions. The control unit 5 of the carriage A controls operations of the article handling device 1, drive wheel assemblies 3, guideline detecting optical sensor 51, communication unit 52 and stopping position confirming optical sensor 53.

Each station S includes a support platform 61 for supporting articles E, a reflector 62 for reflecting light emitted from the stopping position confirming optical sensor 53, a communication unit 63, an optical sensor 64 for checking presence or absence of articles E on the support platform 61, and a control unit 6 for controlling operations of the communication unit 63 and optical sensor 64.

Each component will be described in greater detail now.

Figure 9:
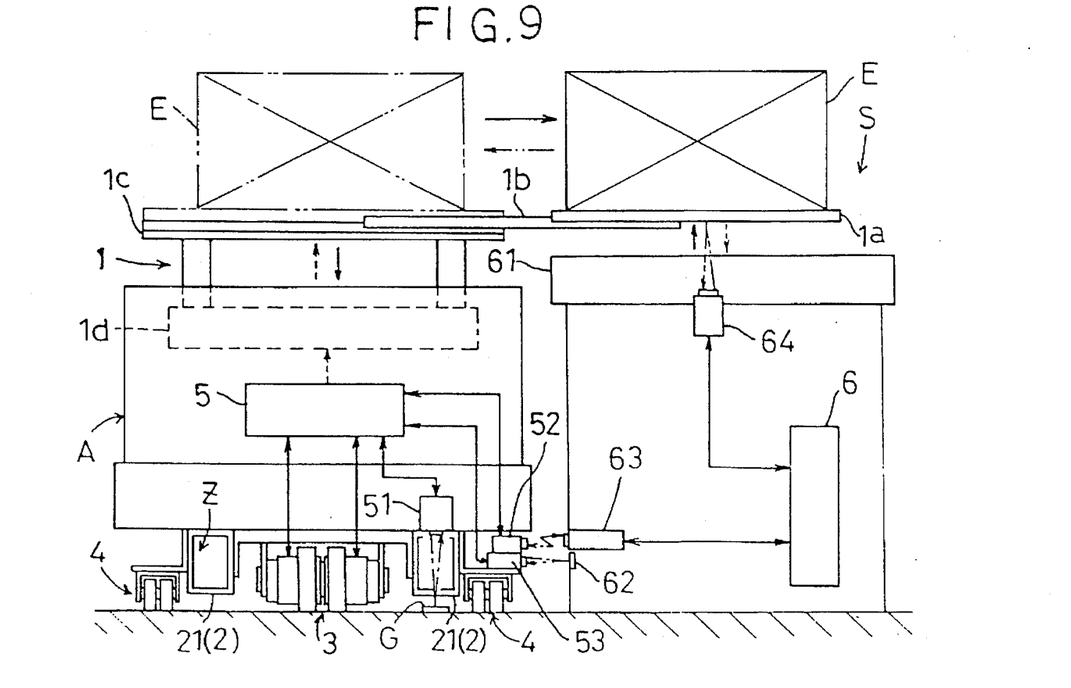
FIG. 9 is a block diagram of a transport control arrangement for the carriage shown in FIG. 6.

As shown in FIG. 9, the article handling device 1 includes a forward fork 1a acting as a carrier deck, an intermediate fork 1b, a base 1c and a lift 1d. The forward fork 1a is transversely slidable relative to the intermediate fork 1b. The intermediate fork 1b is transversely slidable relative to the base 1c. The base 1c is vertically movable by the lift 1d.

When collecting an article E from the support platform 61 of the station S, the forward fork 1a and intermediate fork 1b are projected to a position under the article E. Then, the lift 1d is driven to raise the base 1c, thereby collecting the article E. This operation is reversed when unloading the article E.

Figure 6:
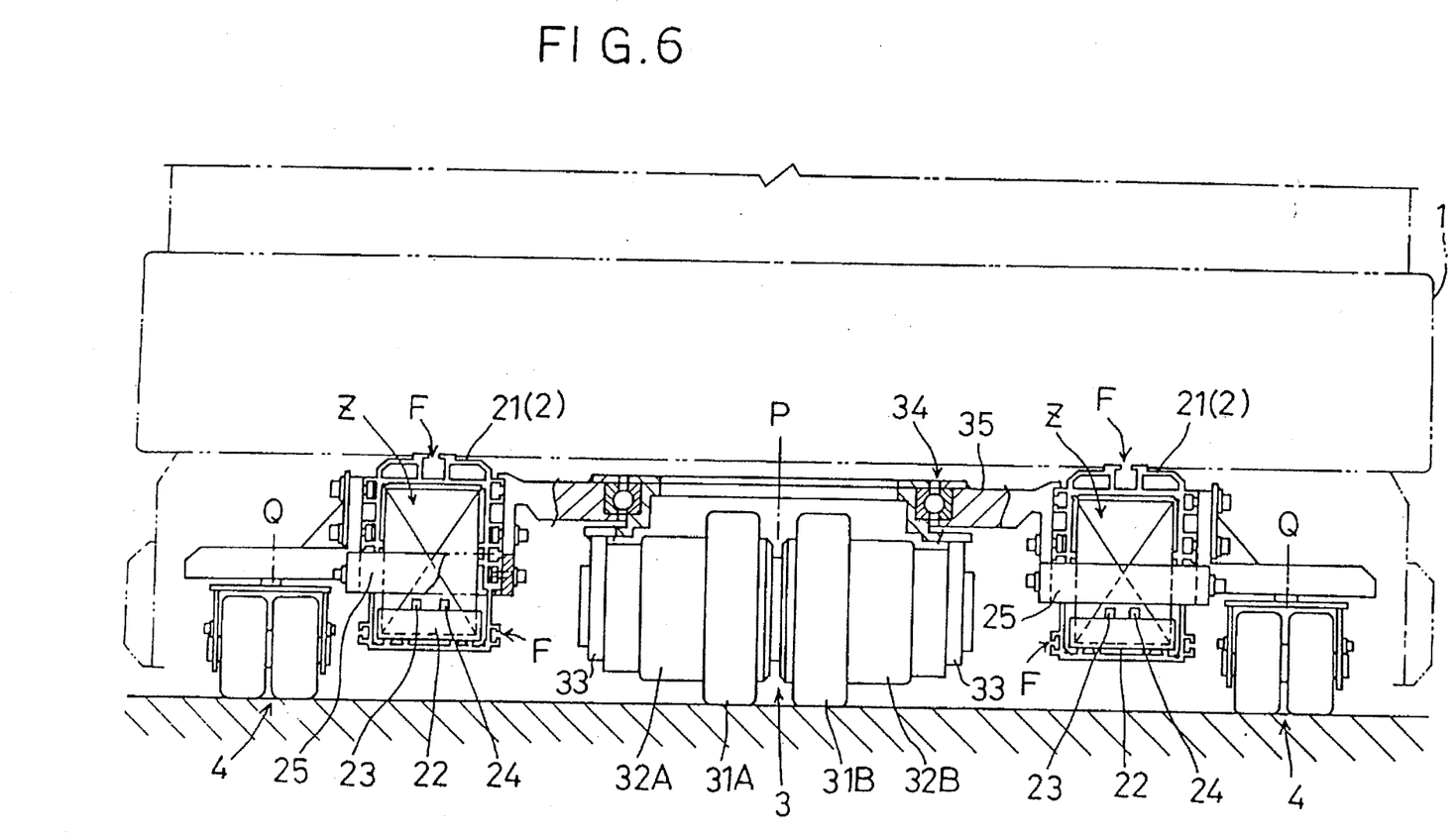
FIG. 6 is a side view of a carriage in a further embodiment of the invention.
Figure 7:
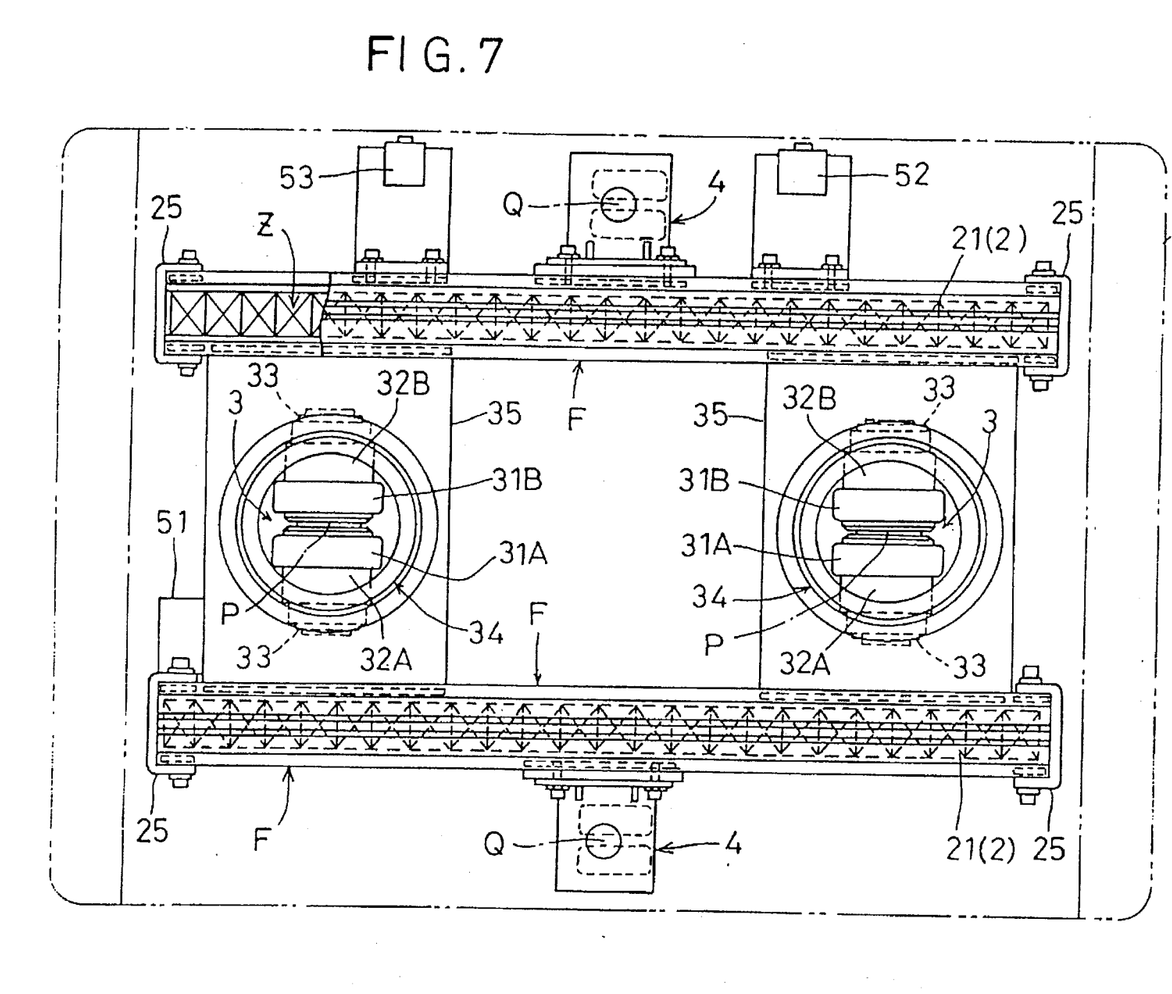
FIG. 7 is a plan view of the carriage shown in FIG. 6.
Figure 8:
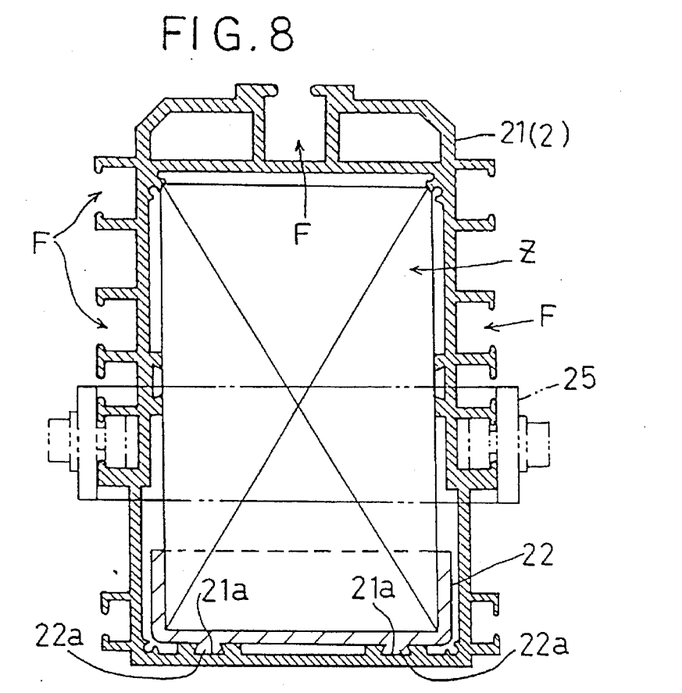
FIG. 8 is a sectional view of a body frame of the carriage shown in FIG. 6.

As shown in FIGS. 6 through 8, the body frame 2 is in the form of hollow base frames 21. The base frames 21 include engaging portions F arranged on outer walls thereof for attaching varied devices (i.e. the article handling device 1, drive wheel assemblies 3, driven wheels 4, guideline detecting optical sensor 51, communication unit 52 and stopping position confirming optical sensor 53).

A deck 22 is removably mounted inside each base frame 21, and a plurality of power storages Z are arranged on the deck 22. That is, the power storages Z are contained in each base frame 21.

As shown in FIG. 8, the deck 22 has projections 22a formed on a lower surface thereof and fitted in rail grooves 21a formed in an inner wall of the base frame 21. These projections 21a are slidable relative to the rail grooves 21a to allow the deck 22 to move into and out of the base frame 21.

The plurality of power storages Z supply power to drive varied devices (i.e. the article handling device 1, drive wheel assemblies 3, control unit 5, guideline detecting optical sensor 51, communication unit 52 and stopping position confirming optical sensor 53).

In the drawings, numeral 23 denotes positive electrostorages Z power storages Z, and numeral 24 negative electrodes thereof. The power storages Z are charged through these electrodes 23 and 24 (which are interconnected, respectively). Numeral 25 denotes clamps for preventing the power storages Z from moving inside the base frames 21 and falling off the base frames 21. Reference Q denotes swivel axes of the driven wheels 4.

As shown in FIG. 6 and 7, each drive wheel assembly 3 includes a pair of wheels 31A and 31B spaced from each other along an axis of rotation thereof, motors 32A and 32B for driving the wheels 31A and 31B, respectively, and a wheel supporting frame 33 for supporting the wheels 31A and 31B and motors 32A and 32B. The wheel supporting frame 33 is attached to the body frame 2 through a bearing 34 and a frame 35 to be swivelable about a vertical axis P located between the pair of wheels 31A and 31B.

Thus, when running the carriage A straight, the control unit 5 of the carriage A causes the motors 32A and 32B to rotate in the same direction and at the same rotating rate. When changing running directions, namely turning the carriage A, the motors 32A and 32B are caused to rotate at different rates.

Each of the motors 32A and 32B includes an encoder (not shown) for detecting rotating rates thereof, and a motor drive circuit (not shown) for driving the motor 32A or 32B. The control unit 5 controls the motor drive circuit based on output of the encoder.

Figure 11:
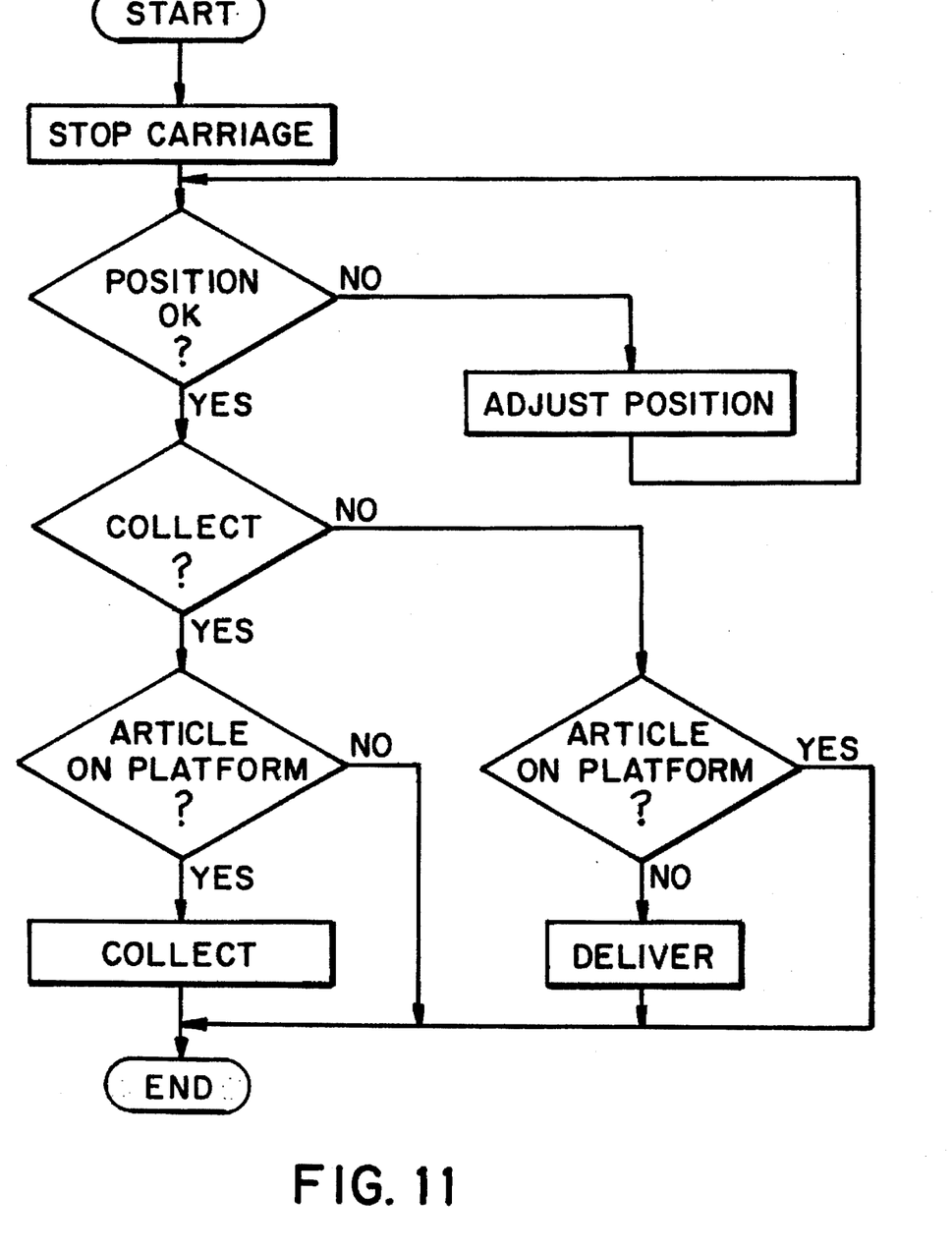
FIG. 11 is a flowchart of a control sequence for the carriage shown in FIG. 6.

A sequence of stopping the carriage A at one of the stations S and collecting an article E therefrom or delivering it thereto will be described with reference to the flowchart of FIG. 11.

First, the carriage A stops at a predetermined position opposite one of the stations S. The stopping position confirming optical sensor 53, in combination with the reflector 62 of the station S, confirms that the carriage A has stopped at the predetermined position. Subsequently, an article transfer operation is carried out based on an article transfer instruction.

If the carriage A is found to have stopped at an improper position, the carriage A is moved forward or backward to correct the position.

If the transfer instruction indicates collection of an article E from the station S, the control unit 5 of the carriage A transmits a signal indicating collection of an article E, through the communication unit 52 of the carriage A and the communication unit 63 of the station S to the control unit 6 of the station S.

If the article E is found on the support platform 61, the article handling device 1 is driven to collect the article E from the station S. If there is no article on the platform 61, the collecting operation is terminated.

If the transfer instruction indicates delivery of an article E to the station S, a signal to that effect is transmitted between the control unit 5 of the carriage A and the control unit 6 of the station S. If no article is found on the support platform 61, the article handling device 1 is driven to deliver the article E to the station. If an article E is found on the support platform 6, the delivery operation is terminated.

This embodiment may be modified as follows:

(1) The carriage A in the above embodiment runs along the guidelines G laid on the track surfaces. Alternatively, the carriage A may include a direction detector, such as a gyro, and a distance detector to provide detection information for determining a current position of the carriage and running the carriage along a predetermined course. (2) Marks using light reflecting or magnetic tape may be placed on the track surfaces to indicate stopping positions. Then, the carriage A may be stopped correctly at predetermined positions based on information provided by such marks. (3) The construction including the forks for transferring articles may be varied in many ways. For example, roller conveyers may be provided on the carriage A and each station S. In this case, a push/pull device may be used to push a support on the roller conveyer of the carriage A toward the station S or to pull a support on the roller conveyer of the station S to the carriage A.

What is claimed is:

1. An article carriage comprising:

a body frame means including a pair of integral, one-piece hollow base frames extending longitudinally of said carriage, each one of said pair of base frames extending substantially straight between one end of said body frame means to the other end of said body frame means, each one of said pair of base frames having an inner face facing the other one of said pair of base frames, an outer face facing away from the other one of said pair of base frames, and a top face;

a pair of connecting frames mounted to said inner faces of said pair of base frames for interconnecting said pair of base frames such that said pair of base frames extends substantially parallel to each other;

a plurality of T-shaped recesses provided on said inner faces, outer faces and top faces of each said hollow base frame, said recesses extending along entire lengths of each said base frame;

at least a pair of wheels mounted to said T-shaped recesses provided on said outer faces of said base frames;

an article support mounted to said T-shaped recesses provided on said top surfaces of said base frames;

a plurality of inserts releasably engageable with said recesses and at least said pair of connecting frames, said pair of wheels, and said article support to secure at least said pair of connecting frames, said pair of wheels, and said article support to said carriage and to secure each said connecting frame to said pair of base frames, each said insert being slidable within said recess along said length of said base frame; and at least one power storage means supported by said pair of base frames.

2. A carriage as defined in claim 1, further comprising a cover, and support frames attached to said recesses, wherein said cover is supported by said support frames.

3. A carriage as defined in claim 2, further comprising a deck on which said power storage means is mounted, said deck supported by said connecting frames.

4. A carriage as defined in claim 1, wherein said article support includes an article handling means for moving said article to and from a station, said article handling means including a frame attached to said recesses.

5. A carriage as defined in claim 4, wherein said article handling means is a roller conveyor.

6. A carriage as defined in claim 1, wherein each said base frame, including said recesses, is configured to be formed by extrusion.

7. A carriage as defined in claim 1, wherein said power storage means is positioned between said pair of base frames such that said power storage means does not project above said top faces of said base frames.

8. A carriage as defined in claim 1, wherein each of said inserts is substantially identical in shape and dimension, and wherein each of said inserts is a rectangular plate placed entirely within said T-shaped recess and has a threaded hole therein.

9. A carriage as defined in claim 1, wherein said T-shaped recesses provided on said inner faces, outer faces and top faces of said base frames are substantially identical in shape and dimension and wherein each of said inserts may be used for all said T-shaped recesses.

10. A carriage as defined in claim 1, wherein said T-shaped recesses provided on said outer faces of said base frames are all flush with one another.

11. An article carriage comprising:

a body frame means including a pair of hollow base frames extending longitudinally of said carriage;

a plurality of T-shaped recesses provided in each said hollow base frame extending along entire lengths of outer peripheral faces of said base frame;

a plurality of inserts engageable with said recesses adapted to secure components to said carriage, each said insert being slidable within said recess along said length of said base frame; and at least one power storage means mounted inside at least one of said hollow base frames.

12. A carriage as defined in claim 11, further comprising decks removably mounted in said hollow base frames, respectively, and a plurality of said power storage means being arranged on each of said decks.

13. A carriage as defined in claim 12, wherein each of said decks includes projections formed on a lower surface thereof and fitted in rail grooves formed in an inner wall of one of said base frames.

14. A carriage as defined in claim 11, further comprising a first optical sensor for detecting a guideline, and a second optical sensor for confirming a stopping position.

15. A carriage as defined in claim 11, wherein each said base frame, including said recesses, is configured to be formed by extrusion.

16. An article carriage comprising:

drive wheels;

driven wheels;

article handling means for transferring articles to stations;

sensor means for detecting a guideline for confirming a stopping position;

communication means;

control means for controlling said article handling means, said drive wheels, said sensor means and said communication means;

a body frame means including a pair of hollow base frames extending longitudinally of said carriage;

a plurality of T-shaped recesses provided in each said hollow base frame extending along entire lengths of outer peripheral faces of said base frame;

a plurality of inserts engageable with said recesses adapted to secure components to said carriage, each said insert being slidable within said recess along said length of said base frame; and at least one power storage means mounted inside at least one of said hollow base frames.

17. An article transporting system comprising:

a plurality of stations;

a running track including a guide tape for connecting said stations; and a carriage for transporting articles among said stations, said carriage including a steering control sensor for detecting said guide tape and providing detection information for use in steering said carriage;

wherein said carriage further includes a body frame means including a pair of hollow base frames extending longitudinally of said carriage;

a plurality of T-shaped recesses provided in each said hollow base frame extending along entire lengths of outer peripheral faces of said base frame;

a plurality of inserts engageable with said recesses adapted to secure components to said carriage, each said insert being slidable within said recess along said length of said base frame; and at least one power storage means mounted inside at least one of said hollow base frames.

18. An article transport system as defined in claim 17, wherein each of said stations has a mark indicating a stopping position, said carriage further including a mark detecting sensor for providing detecting information for use in stopping at each station.

19. An article carriage comprising:

a body frame including a pair of integral, one-piece hollow base frames extending longitudinally of said carriage, each of said pair of base frames extending substantially straight between one end of said body frame to the other end of said body frame, each one of said pair of base frames having an inner face facing the other one of said pair of base frames, an outer face facing away from the other one of said pair of base frames, and a top face;

a pair of connecting frames mounted to said inner faces of said pair of base frames for interconnecting said pair of base frames such that said pair of base frames extends substantially parallel to each other;

a plurality of T-shaped recesses provided on said inner faces, outer faces, and top faces of each said hollow base frame, said recesses extending along entire lengths of said body frame;

at least a pair of wheels mounted to said T-shaped recesses provided on said outer faces of said base frames;

an article support mounted to said T-shaped recesses provided on said top surfaces of said base frames; and a plurality of inserts releasably engageable with said recesses and at least said pair of connecting frames, said pair of wheels, and said article support to secure at least said pair of connecting frames, said pair of wheels, and said article support to said carriage and to secure each said connecting frame to said pair of base frames, each said insert being slidable within said recess along said length of said base frame.

* * * * *